March 30, 1965 W. H. SQUIER ETAL 3,175,936
METHOD OF PREPARING LAMINATED FOAM ARTICLES
Filed March 14, 1962
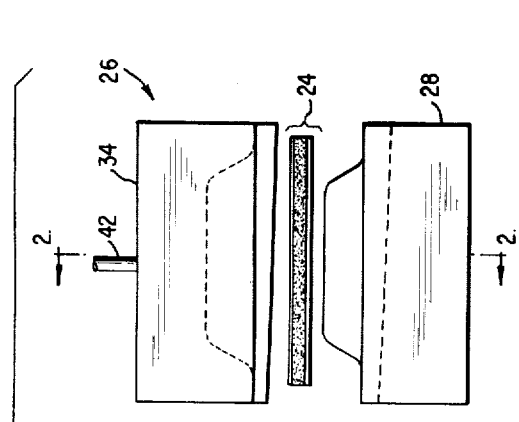
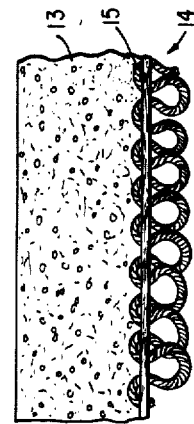
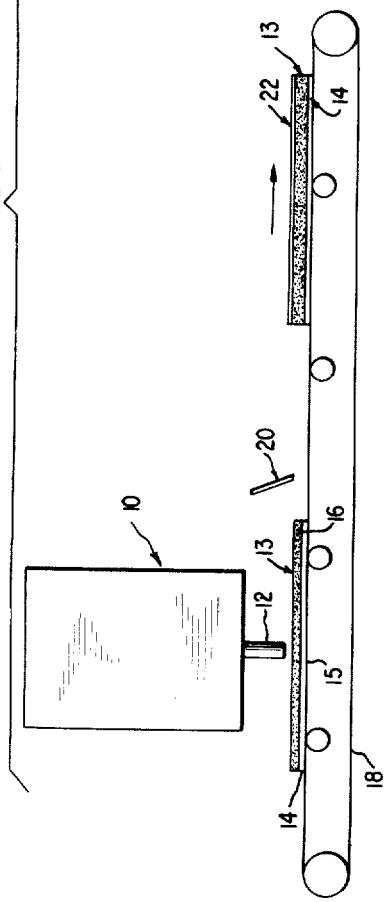
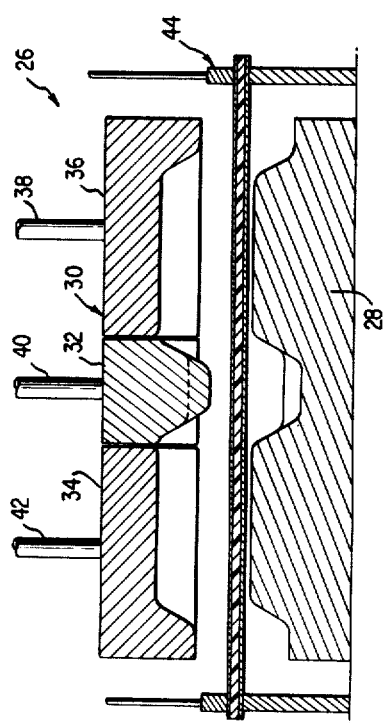
INVENTORS
WILLIAM H. SQUIER
JAMES A. JULIAN
BY
ATTORNEYS

United States Patent Office 3,175,936
Patented Mar. 30, 1965

3,175,936
METHOD OF PREPARING LAMINATED FOAM ARTICLES
William H. Squier and James A. Julian, Greenville, S.C., assignors to J. P. Stevens & Co., Inc., New York, N.Y., a corporation of Delaware
Filed Mar. 14, 1962, Ser. No. 179,540
5 Claims. (Cl. 156—79)

The present invention relates to laminated plastic foam articles and to an improved method for preparing the same. More particularly, the present invention relates to a method of laminating a polyurethane foam layer to other sheet materials including fabrics and to the articles formed therefrom.

Laminates consisting of a foamed plastic layer, such as polyurethane, bonded to one or more layers of plastic or fabric materials, are known and have found considerable application in the making of panel members that are characterized by having excellent thermal and electrical insulating properties. However, methods devised today for bonding the foam plastic layers to the other layers whether plastic or fabric, have not proven too effective or economical. In general, the plastic foam is first formed into a sheet and thereafter is bonded to another sheet material by means of a liquid adhesive, such as glue. However, such a manufacturing process is relatively cumbersome and expensive. In many instances, permanent bonding between the layers is not effected, resulting in a delaminating of the layers. Accordingly, it would be highly desirable to form laminates wherein the layers thereof not only firmly adhere to one another but the foam layer thereof can be made directly from a foamable plastic composition.

It is, therefore, an object of this invention to provide an improved method for preparing laminated plastic foam articles.

A further object of this invention is to provide a continuous method for preparing a laminated plastic foam article.

A further object of this invention is to provide a method for preparing a laminate containing a plastic foam layer which is made directly from a foamable plastic composition.

A further object of this invention is to provide a method for preparing a molded laminate containing a plastic foam layer which is foamed preliminarily and then is foamed again during the molding of the laminate.

A further object of this invention is to provide a method of preparing a laminate containing a plastic foam layer which is firmly bonded to one or more layers, such as fabric, without the use of an adhesive.

A further object of this invention is to provide an improved laminate of complex configuration containing a plastic foam layer which is firmly and integrally bonded to one or more layers comprising the laminated article.

These and other objects and advantages will be apparent from the description which follows.

According to the present invention a layer of a foamable plastic composition, preferably polyurethane, is deposited by frothing on a layer of material, preferably fabric. A second layer, such as fabric, can be superimposed upon the plastic composition which immediately undergoes a preliminary foaming. The resulting laminate comprising a layer of plastic foam and one or two layers of material is then transferred to a molding apparatus which simultaneously shapes the laminate into the desired configuration while the foamable plastic undergoes a further foaming during the molding thereof. The mold is then opened and the completed laminated article having a permanent set or shape is removed therefrom.

The nature of the present invention will become more evident from the following detailed description thereof when read in conjunction with the accompanying drawings in which:

FIG. 1 is a side elevation view partly in section of one embodiment of the invention in which a plastic foam is laminated to a fabric;

FIG. 2 is a cross-sectional view taken along the line 2—2 of FIG. 1 of the molding apparatus employed; and FIG. 3 is a cross-sectional view of a laminated article consisting of two layers only, namely, foamed polyurethane and a tufted carpeting.

In the embodiment of the invention illustrated by FIGS. 1 and 2 there is shown the molding of an automobile carpet having a non-flat surface consisting of convex and concave surfaces. As shown by FIG. 1, reference numeral 10 is a conventional mixer with a letdown system wherein the foamable polyurethane formulation is homogeneously blended and thereafter metered from orifice member 12 as a layer 13 onto an inverted tufted carpeting 14 of rayon having a backing 15 and tufted upper surface 16 such that a one-half inch layer of the polyurethane is deposited thereon. The carpeting 14 in turn is continually advanced by a conveyor belt 18. A doctor bar 20 is employed to insure a uniform coating of the polyurethane. Thereafter, a further layer 22 such as jute, can be positioned upon the polyurethane plastic.

The aforementioned deposition of the foamable polyurethane is effected by a technique known as frothing. The polyurethane contains a very volatile liquid, such as dichlorodifluoromethane (DCDFM), which causes the polyurethane to expand partially as the polyurethane leaves the metering orifice 12 due to the reduction in pressure. Although conventional mixers will do, they are generally equipped with a letdown system so as to accommodate the vapor pressure of the DCDFM which ranges from 85 to 105 p.s.i.g. at mixing temperatures of 80° to 90° F. After the preliminary in situ foaming, a second in situ foaming occurs which is primarily due to the liberation of the carbon dioxide formed during the final formation of the polyurethane by the reaction and cross-linking of its principal reactants, namely, an isocyanate and a glycol. For additional details regarding this "frothing" technique, see page 58 of Chemical and Engineering News for October 9, 1961.

Unlike conventional methods where a reactive urethane mix completely expands in a single step, frothing makes it possible to pre-expand foam by using a low-boiling liquid under pressure in the reactant mix. As the material leaves the mixer, the volatile liquid is vaporized by the reduction in pressure, causing the urethane foam reactant to expand partially. In a second step, the frothed foam is further expanded to final density and cured. Volatile liquids discussed in the aforesaid articles are fluorinated hydrocarbons, including dichlorofluoromethane (DCDFM).

Thereafter, the plastic foam-carpeting-jute laminate 24 is advanced by conveyor 18 to molding apparatus 26, the details of which are shown in FIG. 2, consisting of a lower member 28 and an upper member 30 having a center section 32 and two side sections 34 and 36, each of which is separately actuated by pistons 38, 40 and 42, respectively, which in turn are connected to hydraulic power means (not shown). In operation, the center section 32 descends first followed by the two side sections to give the laminate 24 its final form and set. During this molding and shaping stage, the second and final expansion of the polyurethane foam along with the cross-linking of the reactive components thereof takes place so as to give the article resulting from this molding stage a permanent set or shape. The mold members 28, 32, 34 and 36, are held in a closed position for such time as to insure that the laminate has assumed the shape of the mold and will hold the configuration imparted by the mold members.

In general, the time interval beginning with the application of the plastic foam to the backing of the tufted carpeting to the moment when the upper die members reach their lowermost position, which determines the final shape that the laminate will take, should not ordinarily take more than three minutes. This is to prevent final setting of the plastic, particularly when polyurethane plastic foam is used, before the laminate assumes its final contoured shape. However, in practice it will be found that the process proceeds rapidly such that no difficulty will be found in applying the plastic foam and positioning the mold members in their closed positions within a time interval of about one minute, which is well within the time before final setting of the plastic occurs.

It will be noted that prior to the present invention the expansion and setting of the polyurethane foam occurred so rapidly that once the foam was applied to the backing of the carpeting it was not possible to transfer the resulting laminate to a mold and shape it since the foam would completely expand and set before the molding or shaping step could be completed.

In certain instances, the use of clamping rings 44, which are well known in the art, can be applied to laminate 24 to stretch the same in all directions so as to insure that no wrinkling of the laminate will occur during molding particularly when laminates of complex configurations are being formed.

Various polyurethane formulations can be mixed and metered by the frothing technique onto the material carpet to be coated. Representative of such formulations is the following:

| Component: | Parts by weight |
| --- | --- |
| Hylene MP [1] | 40 |
| Niax Triol LG–56 [2] | 100 |
| Silicone L–520 | 1 |
| Stannous octoate | .2 |
| Triethylenediamine | .3 |
| Dichlorodifluoromethane | 5.0 |
| Water | 3.2 |

[1] Product consisting of 20% of 2.6 diisocyanate toluene made by Union Carbide Company.
[2] Product consisting of a polyoxypropylene glycol made by Union Carbide Chemicals Company and further identified in the publication entitled: "Niax Polyethers," copyright 1961 by Union Carbide Chemicals Co., page 4, as a polyether triol having an average molecular weight of about 3000 and an average hydroxyl number of 56 (mg. KOH/g.).

Silicone L–520 is a water-soluble organo-silicone copolymer used as a surfactant and which has a hydroxyl number of 20 (mg. KOH/g.) as identified by the publication of the Union Carbide Chemicals Company entitled "Niax Polyethers." Copyright 1961, page 9.

The above components, when mixed in a conventional mixing machine, such as the Novo mixing machine made by the Mitchell Specialty Co., are then delivered from the mixing head of said machine as a froth onto a substrate or backing of a tufted carpeting such as carpet 14 in the present instance.

The above formulation is merely by way of illustration, and it is evident that similar formulations using other isocyanates and glycols can be employed. The thickness of the frothed polyurethane is a matter of choice depending upon the ultimate use of the finished article. Thicknesses of one-fourth to five-eighths inch have been used with satisfactory results.

It is also evident that the jute layer 22 may be dispensed with for certain applications such that only a two layer laminate consisting of the polyurethane layer 13 and carpeting 14 is formed, as shown in FIG. 3. Moreover, fabric materials other than jute can be used. In addition, for certain purposes, it may be found desirable to heat the lower and/or upper mold members which technique is well known in the plastic molding art. The tufted carpeting employed in the embodiment described above was rayon, but any tufted carpeting can be used subject to functional and cost requirements. Although the present process is particularly effective with respect to foam polyurethane, it is evident that other foam plastics having similar characteristics can be used in the process of this invention.

In the foregoing description it will be apparent that there has been devised an efficient and economical method whereby a contoured laminate consisting of at least one layer of foam plastic is firmly embedded into the backing of a tufted carpeting. The resulting laminate has not only a good cushioning effect, but is characterized by excellent sound absorption and heat insulating properties. In addition, the adherence of the foam plastic is such as to prevent the tufts of the carpeting from pulling out. Moreover, the molded carpeting made by the process of this invention retains its shape even in those instances where deep draws are effected and the contours are complex as in the case of carpets molded for automobile floor coverings.

While an illustrative embodiment of the invention has been described hereinbefore with particularity it will be understood that varous other modifications will be apparent to and can readily be made by those skilled in the art without departing from the scope and spirit of the invention. Accordingly, it is not intended that the scope of the claims appended hereto be limited to the examples and descriptions set forth herein, but rather that the claims be construed as encompassing all the features of patentable novelty which reside in the present invention including all features which would be treated as patentable equivalents thereof by those skilled in the art to which the invention pertains.

What we claim is:

1. The process of forming a three-dimensional laminated article of complex configuration comprising mixing together under pressure polyurethane-forming reactants and a low boiling liquid blowing agent, depositing the reaction mixture onto a surface of a fabric at a lower pressure, the reduction in pressure causing the volatile liquid blowing agent to vaporize thereby causing a partial expansion of the formed polyurethane, said partially expanded polyurethane penetrating into the surface of said fabric and embedding the fibers of said fabric therein, placing said fabric and said partially expanded polyurethane in a fully enclosed pressure mold which is of the configuration to be imparted to the said laminated article and maintaining said fabric and said polyurethane within said mold while simultaneously further expanding said polyurethane until the polyurethane foam is fully expanded and crosslinking of the reactive components of the polyurethane-forming reactants is completed whereby the polyurethane foam laminate assumes the shape and configuration of the mold and is permanently set in the desired configuration of the laminate.

2. The process of forming a three-dimensional laminated article of complex configuration comprising mixing a composition of polyurethane-forming reactants with a volatile liquid blowing agent under pressure, depositing the reaction mixture onto a surface of a fabric at a lower pressure thereby causing the volatile liquid to volatilize and causing the formed polyurethane to partially expand to form a polyurethane froth, said froth penetrating into the surface of said fabric and embedding the fibers of said fabric therein, placing said fabric and said partially expanded polyurethane in a fully enclosed pressure mold which is of a configuration to be imparted to the said laminated article and maintaining said fabric in said pressure mold and completing the crosslinking reaction of the polyurethane reaction mixture, a gas being liberated therefrom as a result of said reaction, said gas resulting in a further expansion of said polyurethane froth to fully expand the polyurethane so as to assume the shape and configuration of the mold and permanently set the desired configuration of the laminate.

3. The process of forming a laminated article as defined in claim 2 wherein prior to the molding of the fabric laminate a second layer of fabric is placed upon the other surface of the partially expanded froth, said second layer of fabric being bonded to said froth during the subsequent expansion and final crosslinking reaction of the polyurethane foam in the mold.

4. The process of forming a laminated tufted carpeting comprising the steps of mixing polyurethane-forming reactants with a volatile blowing agent under pressure, depositing the polyurethane reaction mixture onto a backing surface of a tufted carpeting at a lower pressure whereby the volatile blowing agent is vaporized by a reduction in pressure causing the polyurethane to partially expand and form a polyurethane froth, said froth penetrating into and embedding the backing of said carpeting therein, placing said fabric and said partially expanded polyurethane in a fully enclosed pressure mold which is of a configuration to be imparted to the said laminated article and maintaining said carpeting in the mold and heating said mold for a period of time sufficient for the crosslinking reaction to proceed and sufficient for the generated gas liberated by the reaction to fully expand the polyurethane until the polyurethane foam is completely expanded to assume the configuration of the mold to permanently set the said configuration of the carpeting.

5. The process of forming laminated tufted carpeting as defined in claim 4 wherein prior to the molding of the carpeting, a layer of second fabric is placed upon the partially expanded froth, said second layer of fabric being bonded to the polyurethane during the expansion in the fully enclosed mold.

References Cited by the Examiner

UNITED STATES PATENTS

| 2,217,137 | 10/40 | Roth et al. _____ 156—79 |
| 2,234,839 | 3/41 | Edwards _____ 154—49 |
| 2,948,650 | 8/60 | Jackson et al. _____ 154—49 XR |
| 2,956,310 | 10/60 | Roop et al. _____ 156—79 XR |
| 2,977,330 | 3/61 | Brower. |
| 3,012,283 | 12/61 | Foster. |
| 3,046,177 | 7/62 | Hankins _____ 156—78 |
| 3,050,432 | 8/62 | Weinbrenner. |
| 3,072,582 | 1/63 | Frost. |

EARL M. BERGERT, *Primary Examiner.*